(No Model.)
T. H. MACDONALD.
GRAPHOPHONE.
No. 527,755. Patented Oct. 16, 1894.
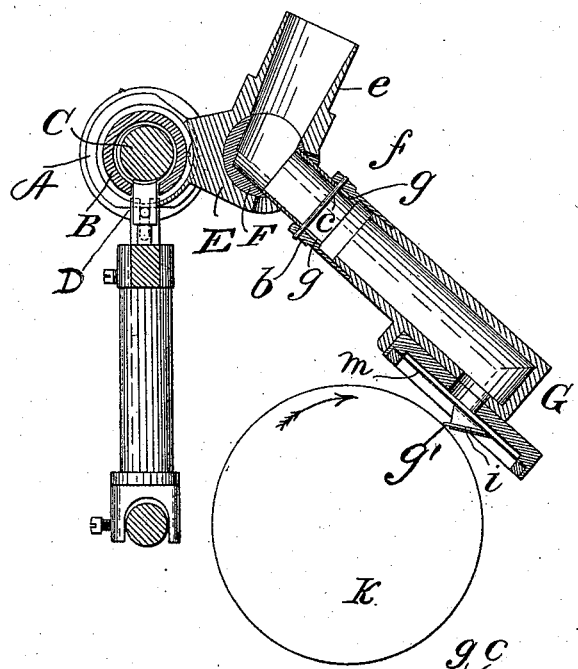
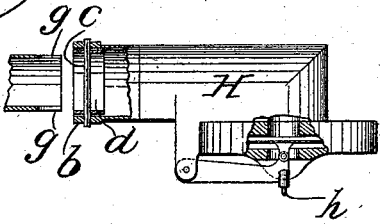
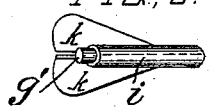
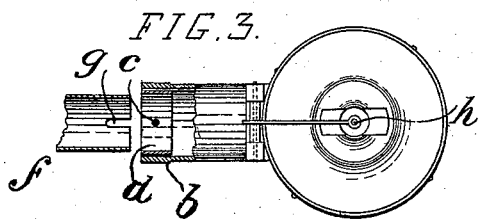
Witnesses.
W. R. Edelen.
Inventor.
Thos. H. Macdonald
by Pollok & Mauro
his attorneys
THE NORRIS PETERS CO., PHOTO-LITHO., WASHINGTON, D. C.

UNITED STATES PATENT OFFICE.

THOMAS H. MACDONALD, OF BRIDGEPORT, CONNECTICUT.

GRAPHOPHONE.

SPECIFICATION forming part of Letters Patent No. 527,755, dated October 16, 1894.

Application filed June 22, 1894. Serial No. 515,408. (No model.)

*To all whom it may concern:*

Be it known that I, THOMAS H. MACDONALD, of Bridgeport, Connecticut, have invented a new and useful Improvement in Graphophones, which is fully set forth in the following specification.

The present invention has reference to the construction of the sound-recording and reproducing parts of instruments known as graphophones or phonographs, and its chief object is to produce a recorder and reproducer which require no adjustment, and which in other respects fulfill the conditions requisite to good practical results.

The chief difficulty heretofore encountered in the use of graphophones has been due to the fact that the recorder and reproducer (particularly the former) required very nice and accurate adjustment, beyond the skill or patience of ordinary users.

Heretofore, the recorder when left free to find its working position by gravity, has had a bridge extending over and in front of the diaphragm, which bridge rested directly upon the tablet. The recording stylus attached to the diaphragm projected a certain distance beyond the bridge, this distance determining the depth of cut and requiring to be regulated with great nicety. When the proper adjustment is slightly disturbed (which frequently happens) imperfect records are made, and trials for readjustment become necessary. Many efforts have been made to overcome this difficulty, but heretofore without success.

In another common type of apparatus the frame of the recorder rests upon a fixed rail which supports its weight and determines its position. The stylus is carried by a weighted lever being pivotally connected thereto. This construction is very delicate and complicated.

By the present invention the adjustment of the recorder is rendered entirely automatic, its construction greatly simplified, and all levers, bridges, and springs are dispensed with.

The recording device as a whole comprises a tubular stem detachably secured to a tubular arm pivoted to swing vertically, a recording point which is fixed directly to the diaphragm and rests upon the tablet without the intervention of any lever, spring or bridge between the tablet and recorder-frame. In other words, the recorder is freely suspended so that its entire weight comes on the recording point, and since the latter is directly fixed to the diaphragm without any intermediate yielding parts the movements of the diaphragm are faithfully recorded, the results in this respect being superior to those heretofore obtained. The swinging stem or arm to which the recorder is attached is pivoted above the axis of the tablet, and the recorder being entirely free bears at its point upon the side of the tablet, the weight of the recorder and the angle at which it is placed determining a proper depth of cut.

The reproducer is in shape and general construction similar to the recorder, having a tubular stem adapted to be detachably connected to the same tubular arm to which the recorder when in use is attached. The stem of the reproducer, however, has a swivel or joint permitting a slight oscillation with minimum friction in a line transverse to the record-grooves of the tablet, this swivel-joint being its most important feature of construction. Heretofore the hollow arm of the reproducer has always been rigid in the direction of its travel, and the stylus has been made of flexible material, or jointed so as to enable it to find and keep the bottom of the record. Such reproducers do not, however, track the record perfectly. When, by reason of slight variance between the spirals of the feed screw and those of the record, the stylus presses on one side or the other of the groove it tends to ride up out of contact with the bottom thereof, and the greater the variance the greater is this tendency.

The difficulty is completely overcome by putting a swivel joint in the stem of the reproducer as above described. In such case the reproducer can oscillate as a whole, and its weight always keeps the point in contact with the record at the bottom of the groove, no adjustment of any sort being required.

This improvement, while important for all classes of machines, is specially valuable for automatic or coin-controlled graphophones.

The invention includes means whereby the connection and disconnection of the recorder and reproducer can be very quickly effected.

The invention will be fully understood from the following description taken in connection with the accompanying drawings, which form part of this specification, and in which—

Figure 1 is a section transverse of the feed screw, showing the carriage for the recorder and reproducer, the former instrument being in place. Fig. 2, is a side view of the reproducer, partly in section; and Fig. 3 a bottom view thereof partly in section. Figs. 4, 5, and 6 are details illustrating the mounting of the recording stylus.

The carriage A, which serves for both recorder and reproducer, slides upon sleeve B, which surrounds the feed screw C, the sleeve being provided on its under side with a long slot to permit nut D to engage with the feed screw.

On carriage A is a coupling-piece E having a thimble $e$ to which the bearing or speaking tubes are connected, and in this coupling piece is swiveled a socket F having a short tubular arm $f$ which projects through a slot in piece E and can oscillate on a horizontal axis to the limits of this slot. Arm $f$ has in its end two slots or notches $g$ diametrically opposite each other. Arm $f$ is the connecting piece for both the recorder G and reproducer H. Each of these devices has a tubular stem $b$ just large enough to fit closely over arm $f$, and a catch pin $c$, which takes into the notches $g$ of said arm and prevents turning of the instrument on the arm. The reproducer H has in the end of its stem a sleeve $d$ which fits loosely therein and is swiveled by means of the catch-pin $c$, the latter being at right angles to the axis of socket F. Thus the reproducer has freedom of oscillation with slight friction transversely to the lines on the recording tablet K. Its stylus $h$ may be practically rigid.

The recorder G when in use rests with its entire weight on the tablet K, but the pressure of its weight, instead of being taken by a bridge or rest as heretofore, comes entirely upon the point $g'$ of the stylus. The axis of the socket F, by which the recorder is freely suspended, is above the axis of the tablet, and the recorder when in use is inclined at a small angle from a vertical line, its point bearing against the side of the tablet. The direction of rotation of the latter is indicated by the arrow, Fig. 1, and the motion of the tablet tends to throw the recorder outward. The weight and the angle of inclination of the latter counteract this tendency to the extent of producing always a proper depth of cut, irrespective of inequalities in the surface of the cylinder.

The point $g'$ of the stylus is in the form of a pencil and is held by a clamp $i$ stamped out of sheet metal. It is bent to form a socket (which receives the pencil and holds it obliquely to the diaphragm) and two wings or flanges $k$ which are cemented, soldered or otherwise affixed directly to the diaphragm $m$. Thus there are no yielding parts between the point and the diaphragm.

It will be seen that the form of instrument is simple and easy of construction, and very strong, having nothing about its construction which is likely to become deranged in ordinary handling and usage. Its chief merit, however, is that the instrument as a whole, comprising a stylus directly fastened to and supported wholly by the diaphragm, and a freely suspended arm, and making contact with the record only at the point of the stylus, constitutes a self-adjusting recorder, requiring no attention from the user, and produces an accurate and in every way satisfactory record.

Having thus described my invention, what I claim is—

1. In a graphophone, the combination with the sliding carriage, of a socket-piece swiveled therein on a horizontal axis and having a tubular arm, and a recorder and reproducer provided each with a tubular stem fitting said arm and adapted for detachable connection therewith, substantially as described.

2. The combination with the sliding carriage, of a socket-piece swiveled therein on a horizontal axis and having a tubular arm slotted or notched in its end, and a recorder and reproducer having each a tubular stem fitting said arm, and a catch-pin for engaging said slot or notch and centering the instrument, substantially as described.

3. The combination with the sliding-carriage, of a socket-piece swiveled therein and having a tubular arm notched in the end, a reproducer having a tubular stem, a sleeve swiveled in the end of said stem and adapted to fit tightly over said arm, and a pin by means of which said sleeve is swiveled, said pin engaging the notch in said arm when the reproducer is in place, substantially as described.

4. A reproducer for graphophones having a freely suspended supporting stem, said stem containing a swivel joint permitting oscillation of the reproducer transversely to the lines of the record, substantially as described.

5. A self-adjusting recorder for graphophones comprising a freely suspended arm, a diaphragm, and a point or stylus attached rigidly to and carried wholly by said diaphragm, said recorder resting freely against the recording tablet and making contact therewith only at the point of the stylus, substantially as described.

6. A recorder for graphophones comprising a diaphragm, a recording stylus in the form of a pencil, a clamp of sheet metal bent to form a socket in which the pencil is held and two wings or flanges by which it is fixed to the diaphragm, the pencil being oblique to the latter, substantially as described.

In testimony whereof I have signed this specification in the presence of two subscribing witnesses.

THOMAS H. MACDONALD.

Witnesses:
WM. R. MILLER,
M. SPEER.